(No Model.) 6 Sheets—Sheet 2.

J. F. DENISON.
ELECTRIC ARC LAMP.

No. 363,611. Patented May 24, 1887.

WITNESSES:
C. Neveux
C. Sedgwick

INVENTOR:
J. F. Denison
BY Munn & Co.
ATTORNEYS.

(No Model.) 6 Sheets—Sheet 4.
J. F. DENISON.
ELECTRIC ARC LAMP.
No. 363,611. Patented May 24, 1887.
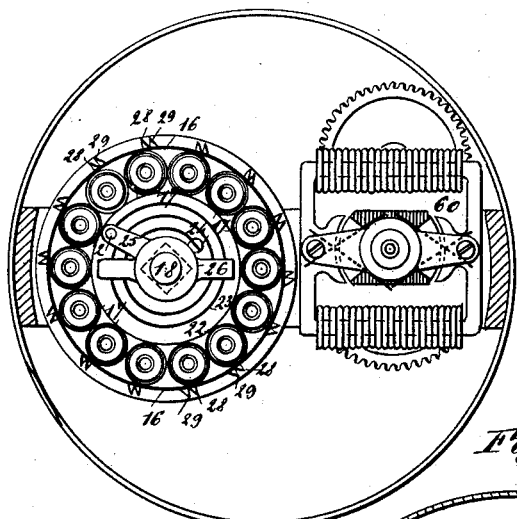
Fig. 4
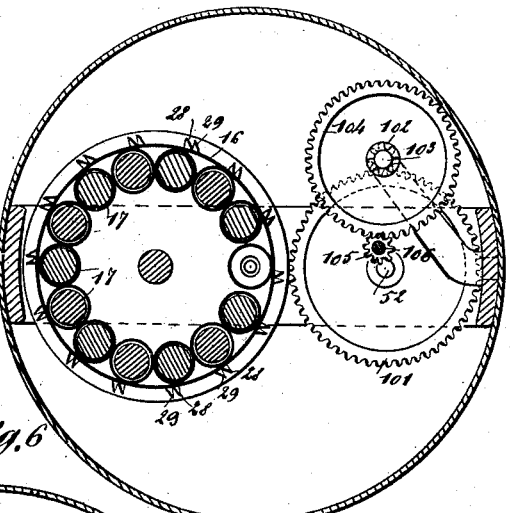
Fig. 5
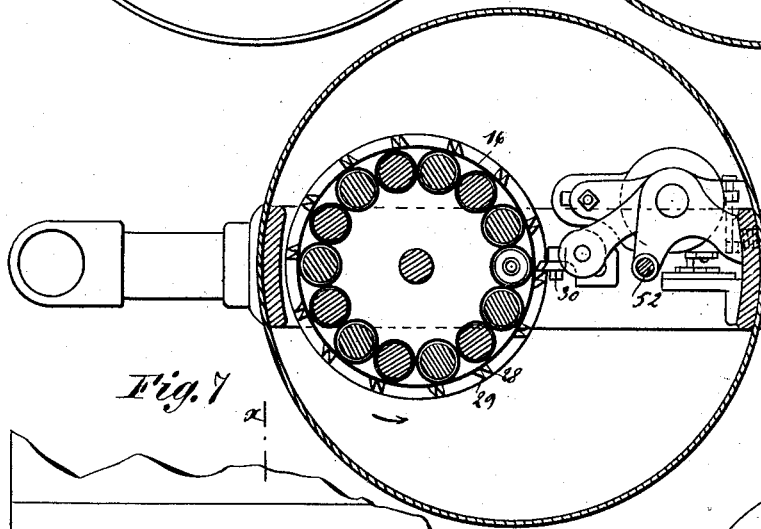
Fig. 6
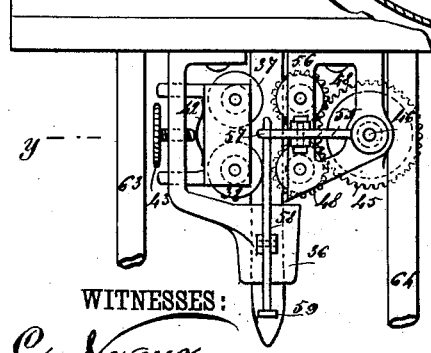
Fig. 7
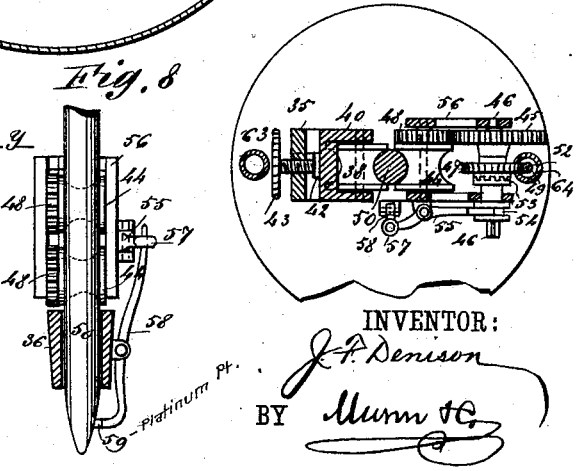
Fig. 8
Fig. 9
WITNESSES:
C. Neveux
C. Sedgwick
INVENTOR:
J. F. Denison
BY Munn & Co.
ATTORNEYS.

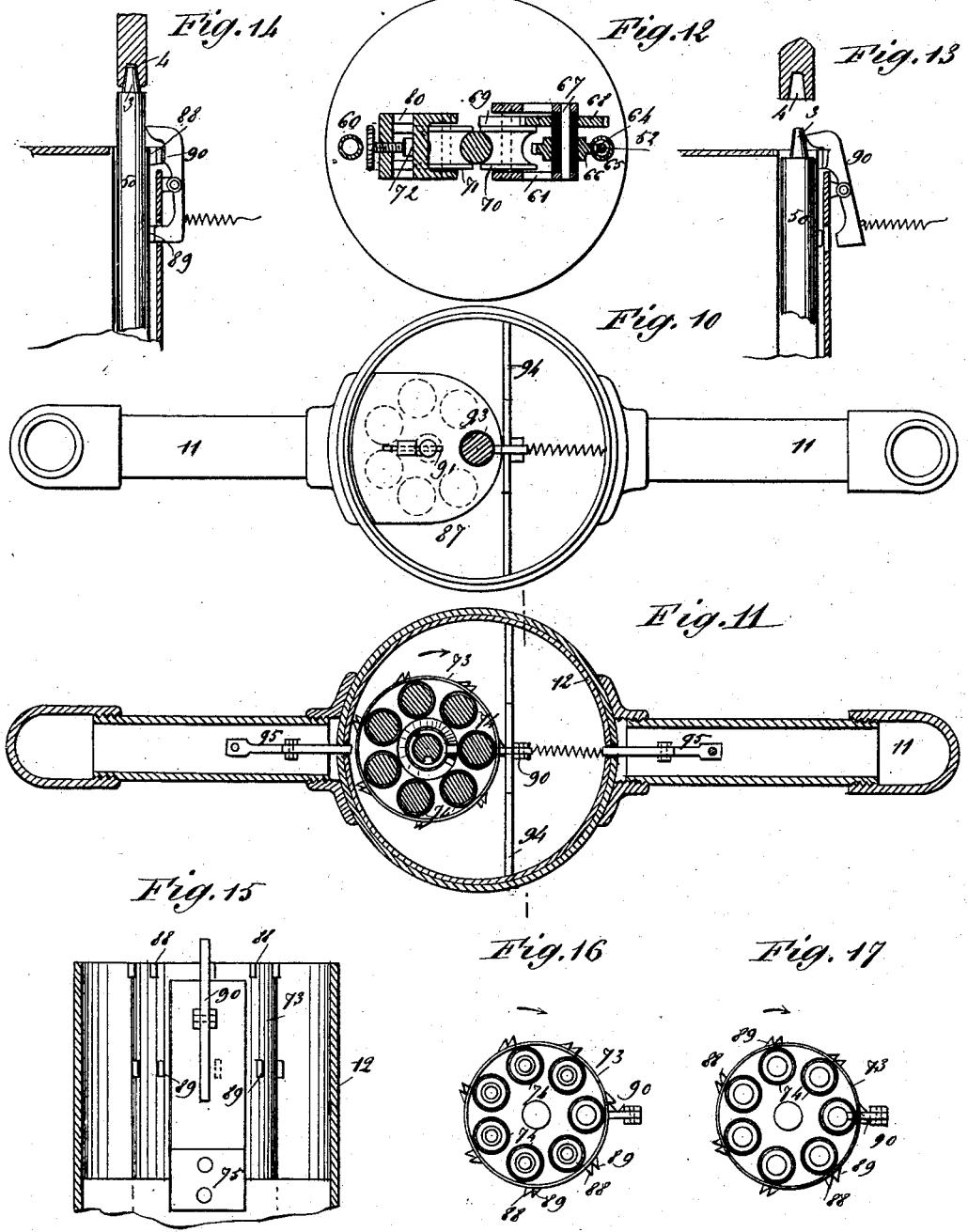

(No Model.) 6 Sheets—Sheet 6.
J. F. DENISON.
ELECTRIC ARC LAMP.
No. 363,611. Patented May 24, 1887.
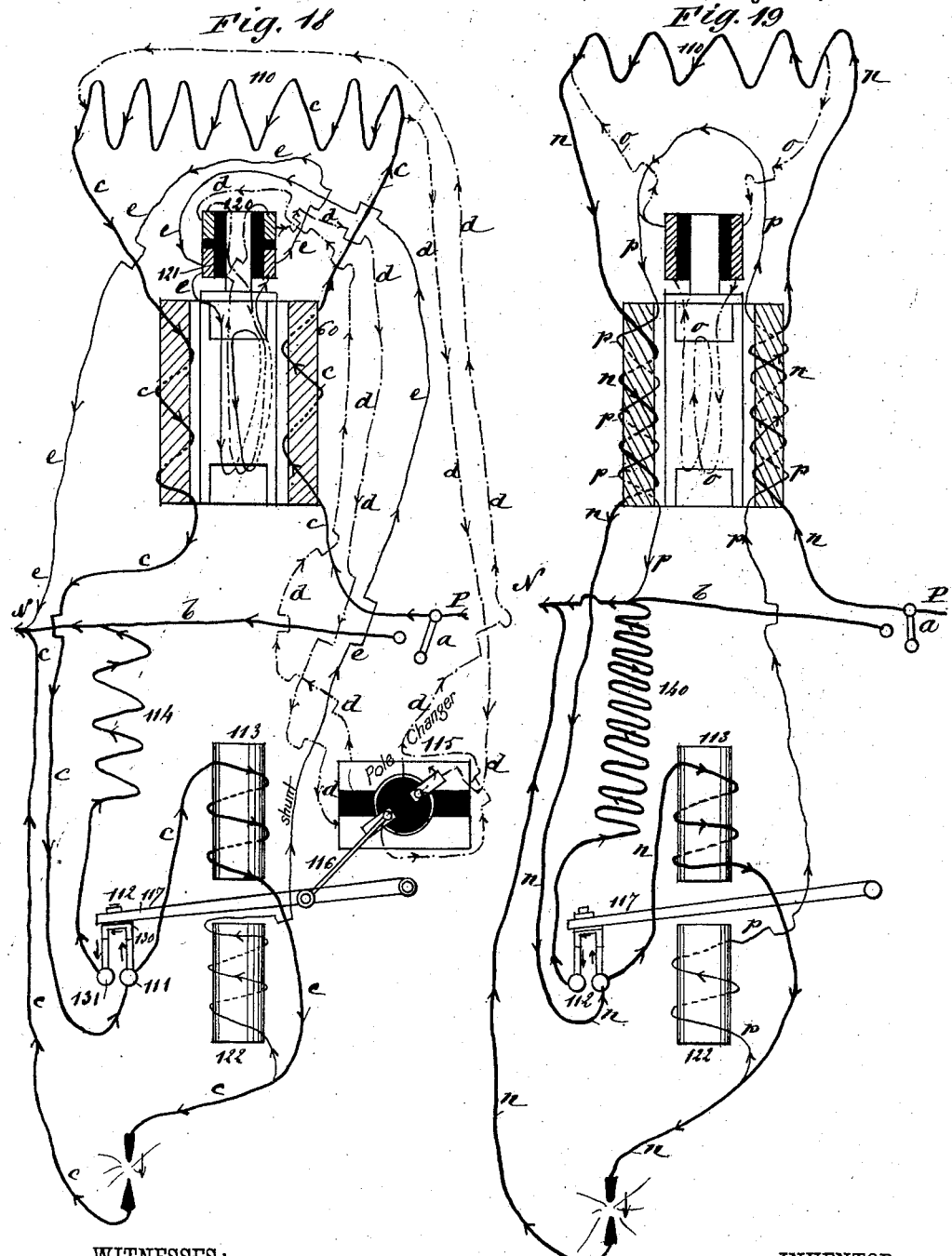
WITNESSES:
C. Neveux
C. Sedgwick
INVENTOR:
J. F. Denison
BY Munn & Co
ATTORNEYS.

UNITED STATES PATENT OFFICE.

JULIAN F. DENISON, OF NEW HAVEN, CONNECTICUT.

ELECTRIC-ARC LAMP.

SPECIFICATION forming part of Letters Patent No. 363,611, dated May 24, 1887.

Application filed May 24, 1886. Serial No. 203,122. (No model.)

*To all whom it may concern:*

Be it known that I, JULIAN F. DENISON, of New Haven, in the county of New Haven and State of Connecticut, have invented a new and Improved Electric-Arc Lamp, of which the following is a full, clear, and exact description.

The object of my invention is to produce a continuous-burning and self focusing arc lamp; and the invention consists, essentially, of carbons of peculiar construction that are arranged in magazines, from which they are fed out successively; and the invention further consists of certain other novel constructions and combinations, to be hereinafter described, and specifically pointed out in the claims.

Reference is to be had to the accompanying drawings, forming a part of this specification, in which similar figures of reference indicate corresponding parts in all the figures.

Figure 1:
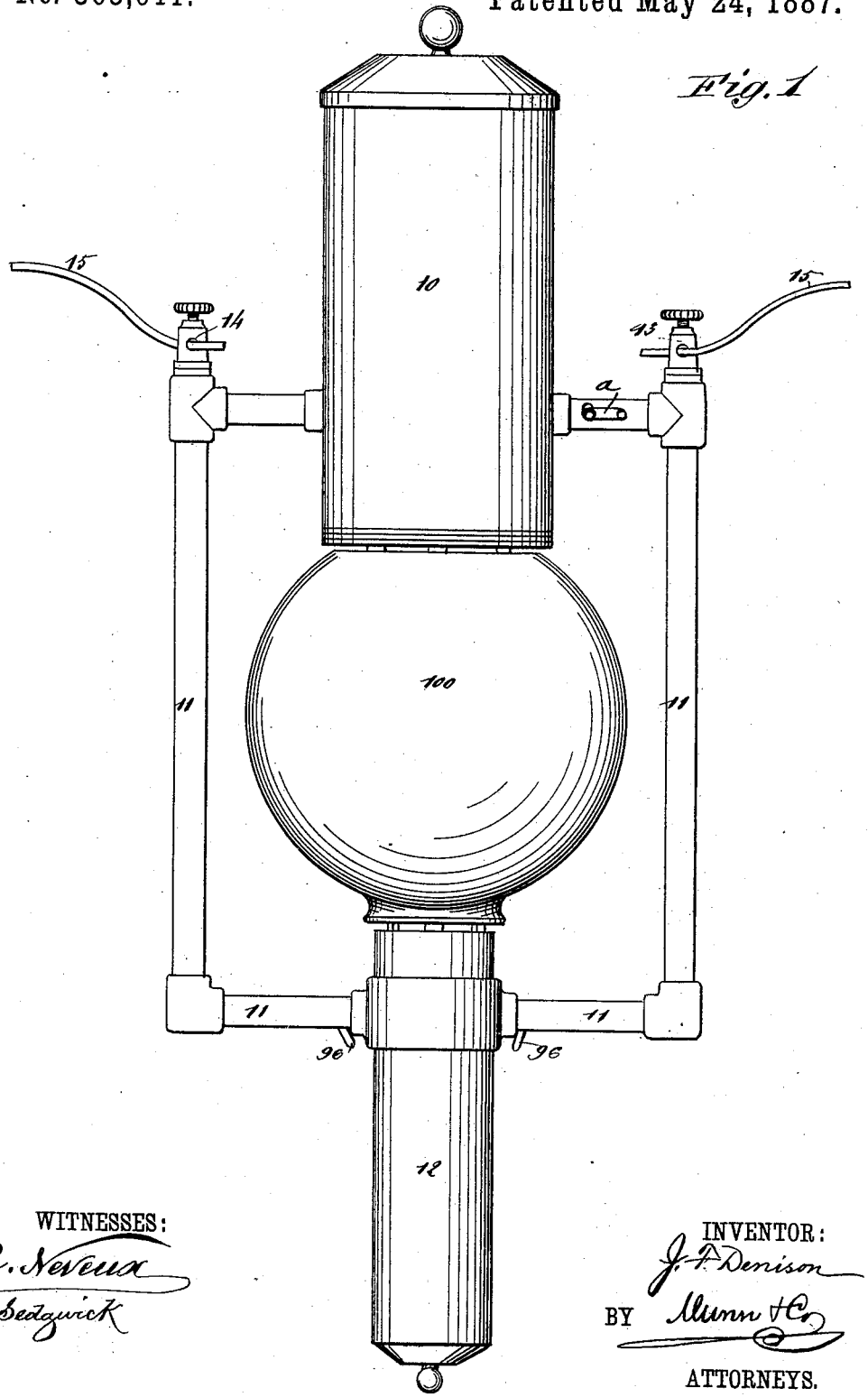
Figure 2:
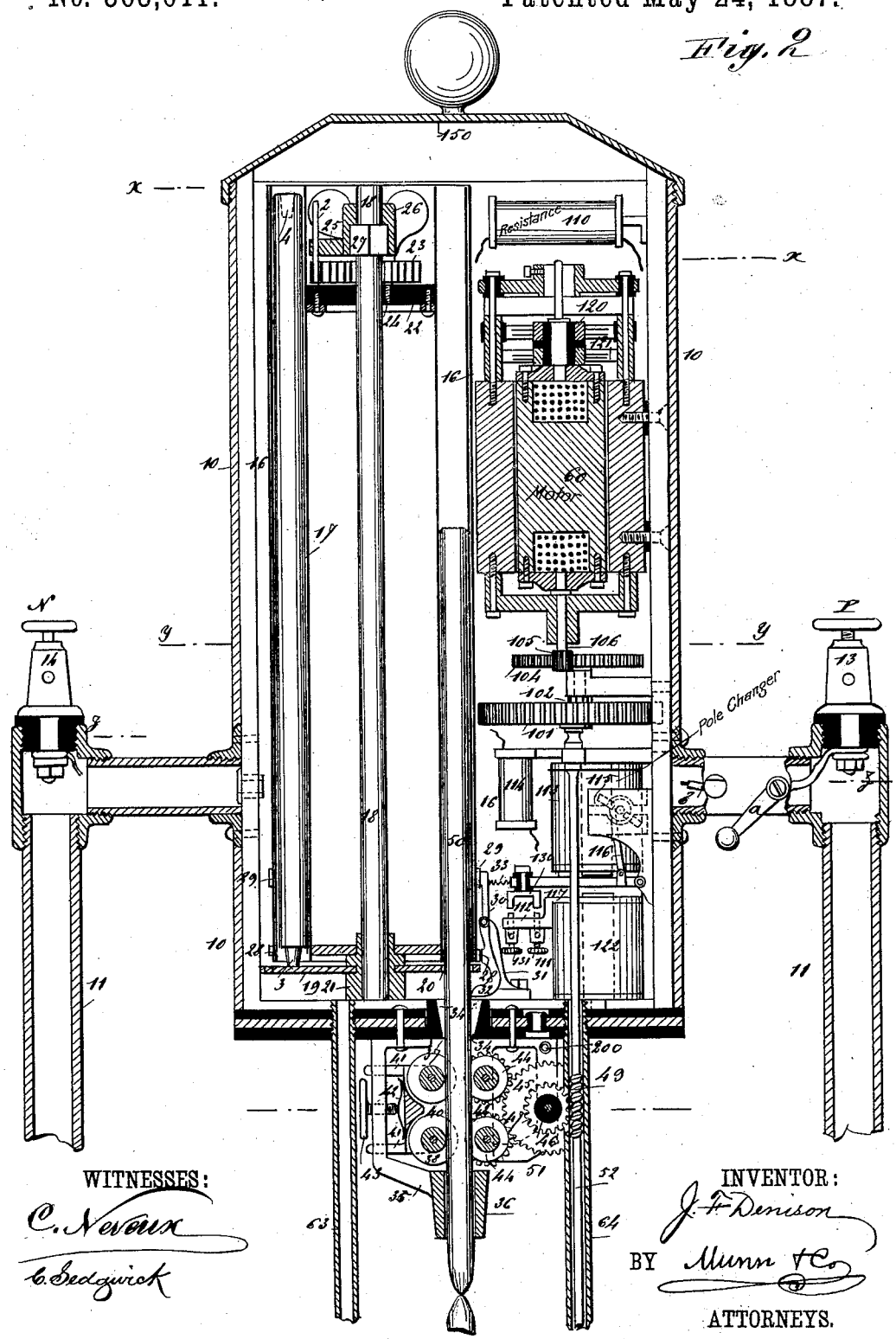
Figure 3:
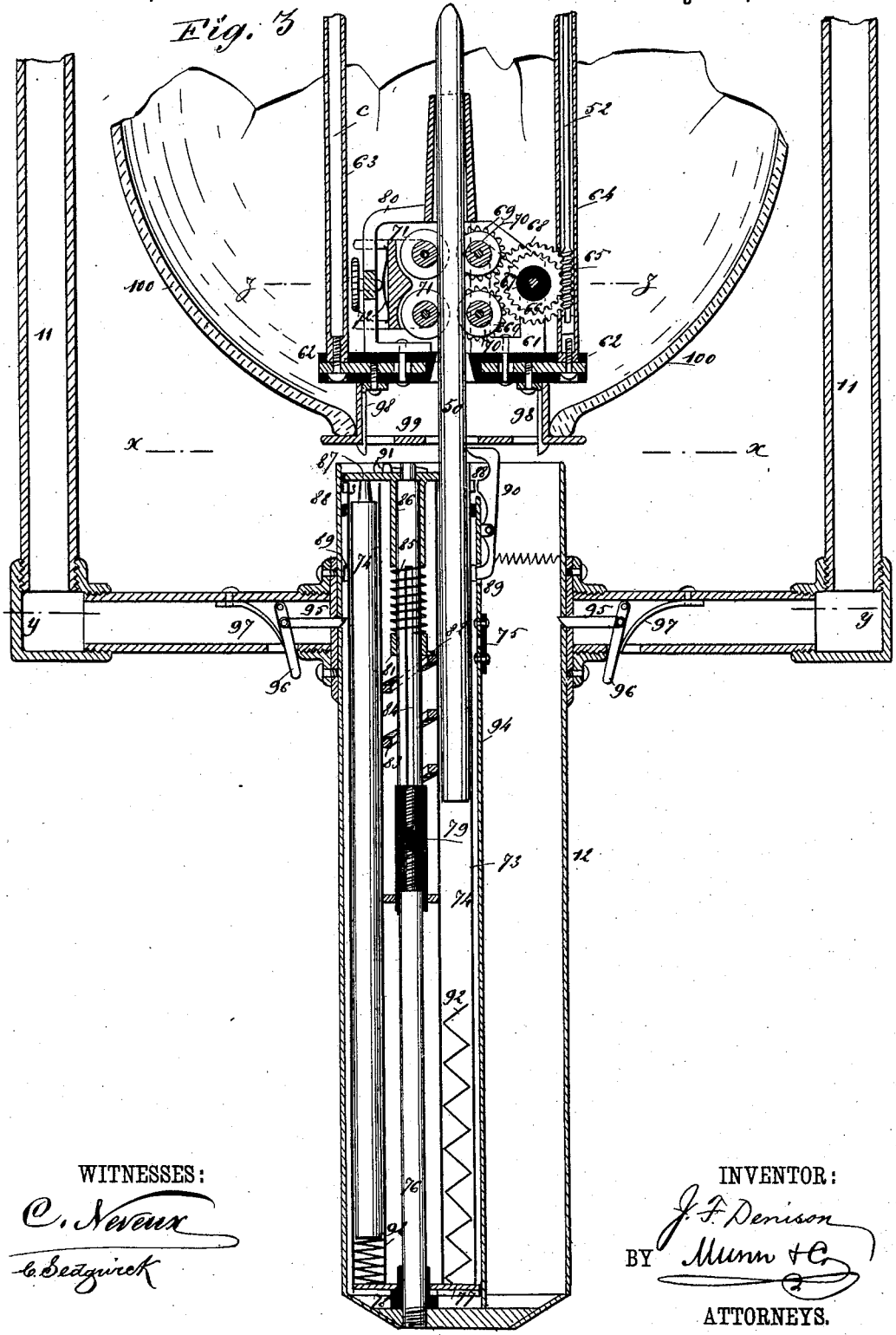

Figure 1 is a side view of the completed lamp. Fig. 2 is a central vertical sectional view of the upper portion of the lamp. Fig. 3 is a similar view of the lower portion of the lamp, Figs. 2 and 3 when taken together representing the lamp as it would appear in central vertical section. Fig. 4 is a sectional plan view taken on broken line $xx$ of Fig. 2. Fig. 5 is a sectional plan view taken on line $yy$ of Fig. 2. Fig. 6 is a sectional plan view taken on line $zz$ of Fig. 2. Fig. 7 is a side view representing the focusing attachment arranged in connection with the upper carbon. Fig. 8 is a sectional view taken on line $xx$ of Fig. 7. Fig. 9 is a sectional plan view taken on line $yy$ of Fig. 7. Fig. 10 is a plan view taken on line $xx$ of Fig. 3, the lower carbon being shown in section. Fig. 11 is a sectional plan view taken on line $yy$ of Fig. 3. Fig. 12 is a view of the feeding mechanism of the lower carbon, taken on line $zz$ of Fig. 3. Fig. 13 represents a portion of the upper part of the lower-carbon case, the parts being shown as they appear just after one carbon has left the case. Fig. 14 represents the parts as they appear after the carbon contained within the case, as shown in Fig. 13, has been forced upward and into the socket of the preceding carbon. Fig. 15 is a side view of the upper portion of the lower-carbon receptacle, the lower part of the lamp-case being shown in section. Fig. 16 is a plan view of the lower-carbon receptacle, representing the parts as they appear in Fig. 14, the cover of the magazine being, however, removed. Fig. 17 is a similar view when the parts are in the position shown in Fig. 13. Fig. 18 is a diagram illustrating the circuiting of the lamp, and Fig. 19 is a diagram illustrating a modified arrangement of the circuits.

In order that the general construction and arrangement of my lamp may be better understood, I will, in so far as is possible, avoid all reference to the circuiting of the lamp until after the mechanical structure of the same has been specifically described.

Referring now more particularly to the general appearance of the lamp as shown in Fig. 1, 10 represents the upper inclosing-case, in connection with which there is arranged the usual frame-work, 11, which serves as the support for a lower case, 12, the frame 11 being provided with binding-posts 13 14, to which the line-wires 15 are connected when the lamp is placed in the circuit. In the upper shell or casing, 10, I mount a carbon-magazine, 16, that is preferably provided with fourteen carbon-receptacles, 17, the said carbon-magazine being mounted on a central shaft, 18, and the lower ends of the carbon-receptacles being closed by a plate, 19, formed with a single aperture, 20, through which the carbons pass one by one, as will be hereinafter more fully explained.

The plate 19 is rigidly connected to and upheld by a block of insulating material, 21, which rests upon the lower portion of the case 10, and this block 21 serves as the step for the vertical shaft 18, which, as before stated, is the support of the carbon-magazine 16, the upper portion of the said magazine being guided by a ring, 22, of insulating material, that is loosely arranged about the shaft 18. Above the ring or plate 22 there is coiled a spring, 23, the inner end of which spring is fixed to a screw, 24, that is carried by the plate 22, while the other end of the spring 23 carries a pin, 2, which projects upward through an arm, 25, which projects outward from a winged hub, 26, that is formed with an irregularly-shaped aperture adapted to fit over a correspondingly-formed projection, 27, that is carried by the shaft 18 above the spring 23, from which construction it will be seen that if the hub 26 is turned about the shaft 18 to coil the spring 23, and then seated upon the irregular portion 27, and the magazine is released, the spring will act to give it a rotary motion about the central shaft; but in order to prevent this rotary motion I provide the magazine 16 with stops 28 and 29, which said stops are arranged in parallel horizontal planes, and the stops 28 being below and slightly in advance of the stops 29.

A double-armed lever, 30, is mounted on a standard, 31, and provided with a hook-shaped end, 32, the point of which is normally held against the carbon 50 by a properly-arranged spring, as 33. This lever 30 is provided with catch-teeth adapted to engage alternately with the stops 28 and 29, the operation being substantially as follows: After the carbon 50 has moved downward through the opening 20 in the plate 19, and below the end 32 of the lever 30, the spring 33 will force the hooked point 32 forward and the spring 23 will throw the carbon-magazine forward in the direction indicated by the arrow in Fig. 6; but this motion will be checked by one of the stops, 28, coming in contact with the lower tooth of the lever 30, the stop 28 being so placed that at this time the point of the succeeding carbon will have passed downward through the opening 20, and in descending by its own gravity will force the point 32 of the lever 30 back against the tension of the spring 33 and bring the upper catch of the lever into engagement with the next stop, 29, of the magazine 16, which stop 29 is so placed as to cause a perfect register between the carbon-receptacles in the magazine 16 and the hole or aperture 20 in the plate 19.

In the bottom of the upper case, 10, just below the aperture or opening in the plate 19, there is an aperture, 34, through which the carbons pass to engage with the feeding mechanism arranged in connection with the upper carbon. This feeding mechanism as a whole I will designate by the numeral 51, and the mechanism consists, essentially, of a bracket arm, 35, upon the lower and inwardly-extending end of which there is a guiding-sleeve, 36. This bracket 35 carries two guiding-rollers, 37 and 38, which are held in a frame, 40, formed with arms 41, which ride in guideways formed in the main frame or body of the bracket, the guiding-rollers being yieldingly held against the carbon through the medium of a spring, 42, the tension of which is regulated by means of a thumb-screw, 43. Upon the opposite side of the carbon there are other rollers, 44 44, that are provided with small gears 48, engaged by a larger gear, 45, that is mounted on a shaft, 46, which said shaft carries a pinion, 47, that is engaged by the worm 49 of a vertical shaft, 52, which shaft, as will presently be explained, is rotated as the necessities of the case require by an electric motor, 60, located in the upper casing, 10. Now, the pinion 47 is loosely mounted on the shaft 46, and consequently the gear 45, which is fixed to said shaft, is only brought into action at such times as the pinion 47 is engaged by a clutch, 53, which rides on a feather formed on the shaft 46, a section of the clutch being carried by the pinion. This clutch 53 is provided with a grooved collar, 54, and in the groove of said collar 54 there rides the bifurcated or forked end of a lever, 55, that is pivotally connected to the bracket 56, by which the parts now being described are supported. The other end of this lever 55 is formed with an eye, 57, and in this eye 57 there rides the upper end of a second lever, 58, that is pivotally mounted upon the guiding-sleeve 36, the lower end of said lever projecting inward toward the carbon and being provided with a platinum point, 59, which rests against the carbon.

The object of this mechanism is to provide for the proper focusing of the lamp—that is, to provide for the maintenance of the arc in practically the same relative position—for with the ordinary working of the lamp the lower carbon is fed upward; but as the arc travels toward the sleeve 36 the point 59 of the lever 58 will drop in against the partially-consumed end of the carbon, and this movement of the lever will throw its upper end out, and consequently will throw out the eye 57 of the lever 55, which movement of the lever 55 will carry the clutch 53 into engagement with the pinion 47, and after the clutch and pinion are in engagement any movement of the main shaft 52 will be communicated through the gears 45 and 48 to the feeding-rollers 44, and the upper carbon will be fed downward until the arc is so far below the platinum point 59 that the upper end of the lever 58 will be forced inward and the clutch 53 be disconnected from its engagement with the pinion 47.

In order that a perfect contact may be maintained between the carbons that are in circuit, I form each carbon with a projection, 3, that is in the form of the frustum of a cone, and in the other end of the carbon I form a recess, 4, arranged to receive the projection 3 of the succeeding carbon, so that as one carbon is carried downward by the action of the feeding-rollers 44 the succeeding carbon, dropping from its receptacle in the magazine 16, will, through the medium of its projection 3, engage with the carbon that is in advance of or just beneath it. The feeding mechanism by which, as before stated, the lower carbons are advanced is held by brackets 61 and 80, that are carried by a plate, 62, fixed to the lower ends of two vertical tubes, 63 64, which said tubes are connected to the lower end of the upper inclosing-case, 10, the main shaft 52 being inclosed within the tube 64 and being provided with a worm, 65, that engages with a pinion, 66, that is carried by, but insulated from, the shaft 67, upon one end of which there is secured a gear, 68, that engages with gears 69, carried by the shafts of the feeding-rollers 70, other rollers, 71, being arranged in a manner similar to that in which the rollers 37 and 38 are arranged—that is, the rollers 71 are held in yielding contact with the carbon by means of a spring, 72.

As the lower carbons, which are connected with the negative pole of the motor, are not consumed as rapidly as are the upper carbons, I have provided a magazine, 73, for said lower carbon wherein there are but seven carbon-receptacles, the said receptacles being shown at 74. This magazine 73 is insulated from the main body of the case 12. The carbon-receptacles proper are carried by a plate, 77, that is free to revolve about the step or sleeve 78, said step or sleeve being made of any proper insulating material. The shaft 76, the upper portion of which is insulated from the lower portion by means of an insulating section, 79, is arranged so as to support the weight of the carbons and their magazine, and this shaft 76 carries a sleeve, 81, formed with a lug, 82, which rides on a spiral inclined way, 83, that is attached to the carbon-receptacles, being arranged in the space between the said receptacles and the shaft 76. This sleeve 81 is provided with a feather, which rides in a groove, 84, formed in the upper section of the shaft 76, and the sleeve is borne upon by a spring, 85, that is coiled about the shaft, one end of the spring abutting against the upper edge of the sleeve, while the other end abuts against the lower edge of a guiding-sleeve, 86, that projects downward from a plate, 87, and is held within the upper end of the carbon-magazine, being keyed to the shaft 76 by a key, 91.

From the construction described it will be seen that unless the magazine 73 is held by a stop it will revolve in the direction of the arrow shown in Fig. 11, and to prevent this movement of the magazine I provide lugs 88 and 89, that are engaged by teeth formed on a hook-pointed lever, 90, in a manner similar to that described in connection with the lugs 28 and 29 and the lever 30, said lugs being so placed that when the lever 90 is in engagement with the lugs 89 the upper end of the carbon-receptacle in connection with which the lug is arranged will register with an aperture, 93, formed in the plate 87. The carbons in the receptacles 74 are seated upon spiral springs 92, of sufficient force to throw the carbons upward until they are within the bite of the feeding-rollers 69 and 71.

The lever 90 is mounted on a dividing partition, 94, arranged within a case, 12, said partition being formed in sections, that are united by an insulating-strip, 75.

The case 12 is held in place by catches 95, that are arranged within the frame-work 11, said catches being operated by levers 96, that are pressed upon by springs 97, the levers 96 extending outward for manipulation, as is best shown in Figs. 1 and 3.

The globe 100 is upheld by a plate, 99, that is in turn supported by spring-clips 98, arranged as best shown in Fig. 3.

The shaft 52 carries a large gear, 101, that is driven by a pinion, 102, carried by a shaft, 103, said shaft also carrying a large gear, 104, that is engaged by a pinion, 105, carried by the main shaft 106 of the motor 60.

The connection with the upper carbon is established through the medium of the rollers 44, which rollers are in electric connection with their supporting-bracket, the main wire $c$ being bound to said bracket by the post 200. The lower carbons are connected to the negative post of the lamp by a wire passing down through the tube 63 to the bracket 80, the rollers 71 carried by said bracket being in electric contact therewith and with the lower carbon.

Having thus fully described the mechanical structure of my lamp, I will now proceed to state how the various electric circuits necessary to operate the lamp are established and controlled.

Referring, now, more particularly to the arrangement of the circuits illustrated in Fig. 18, wherein the parts are shown in the position they assume when the carbons are separated by too great a space for the formation of an arc, I will trace the course of the current as it enters the lamp and will point out the various changes which result from the movements imparted to the carbons. When the lamp is not in circuit, the current passes through a switch, $a$, which connects with a wire, $b$, that passes directly from the positive to the negative terminal of the lamp; but when the lamp is to be thrown in circuit the switch $a$ is moved to the position shown in Figs. 2 and 18, and the current entering the positive post of the lamp will be carried by the line $c$, through the field-magnets of the motor 60, through a resistance-coil, 110, which may be located between the positive post and the motor, or, as indicated, between the field-magnets of the dynamo, or in any other convenient position, then to one of the binding-posts, 111, of an automatic cut-out, 112, then over the bridge 130 of said cut-out to the other binding-post, 131, and through a slight resistance, 114, and out through the negative post of the lamp, said resistance 114 being only heavy enough to start the current through the carbons the moment they are brought in contact. From the resistance 110 there is a circuit, $d$, which encircles the armature of the motor, and in which there is interposed a pole-changer, 115, that is operated by a link, 116, connected to the armature carrying lever 117 of the cut-out 112, and when the carbons are separated the motion imparted to the armature of the motor 60, and through the medium of the intermediate gearing to the shaft 52, will cause said shaft to revolve in such a direction that the carbons will approach each other, the current passing through the circuit $d$ being a derived circuit taken from the resistance-coil 110. The instant the carbons touch, the main current, instead of passing through the resistance 114, will take the new passage opened by the meeting of the carbons, and in this new passage there is included the coil of the cut-out magnet 113, the current passing through said magnet, through the carbons, and out through the negative post of the lamp. The charging or energizing of the magnet 113 will draw up the lever 117 and disconnect the contacts of the cut-out 112, and as the lever 117 is drawn up the pole-changer will be shifted, so that the direction of the current passing through the armature of the motor will be changed, and the motion of the armature will consequently be reversed, so that the carbons will be separated and the arc formed.

In the system under consideration the armature of the motor is provided with two commutators, 120 and 121, of which the commutator 120 is the one used in connection with the circuit $d$, while the other is used in connection with the shunt-circuit $e$, which said shunt passes from the main circuit through the coil of a magnet, 122, that is arranged in opposition to the magnet 113, then up through the coils of the armature of the motor, and out through the negative post of the lamp. As the arc increases in length the strength of the current passing through the shunt-circuit will be increased to an extent sufficient to overbalance the power of the current passing through the circuit $d$, and the motor will be driven so that the carbons will be caused to approach, and the resistance of the arc will be thereby decreased, and during the time that the lamp is burning the direction of the rotation of the armature will be such as to maintain a proper distance between the carbons to produce the required arc, the direction of the rotation of the armature changing to meet the exigencies of the case; but when the carbons are separated and the points of the cut-out are in contact the direction of rotation is always such as to feed the carbons together. It will be understood that the current passing through the shunt is sufficiently strong to overcome the derived current passing through the circuit $d$, which, as before stated, operates to separate the carbons when the cut-out is first elevated; but I have found this arrangement necessary in order that the derived current may act to separate the carbons to form the arc, as above described.

In the second system of circuiting, which system is shown in Fig. 19, the main current $n$, entering the lamp at the positive post, passes through a resistance, 110, located as hereinbefore described, through the coils of the field-magnets of the dynamo, through the cut-out 112, through a heavy resistance, 140, equal to the resistance of an exceedingly long arc, and out through the negative post of the lamp. In this system there is a derived current passing through a circuit, $o$, which includes the armature of the dynamo. In passing through the lamp the main current sends a current through the shunt-circuit $p$, that is arranged as shown in the diagram, and this divisional current passing through the shunt is strong enough to overcome the influence of the main current passing through the field-magnets of the motor, the shunt being wound over the main wires of the field-magnets and arranged so that the current passes in a direction opposite to that in which the main current passes. As the armature of the motor is energized by the derived current passing through the circuit $o$, it will rotate in a direction to feed the carbons together; but the instant the carbons touch, the current will leave the high-resistance coil 140 for the new passage of less resistance through the carbons, and, as at this time the carbons offer a smaller resistance than is encountered by the shunt, the current passing through the shunt will be diminished and the current passing through the main circuit $n$ will predominate, so that the direction of the rotation of the armature will be reversed and the carbons will be separated to produce the arc.

In leaving the resistance-coil the main current passes through the cut-out magnet 113, and as this magnet is energized the contacts of the cut-out will be separated and the passage through the high resistance coil broken; but should the arc increase in length beyond the normal limit through an accident to the feeding mechanism, or from any other cause, the shunt-current would become excessively strong, and would so strongly energize the magnet 122, arranged in opposition to the magnet 113, that said magnet 122 would overcome the attractive force of the magnet 113 and act to re-establish the passage through the coil 140.

The mechanism employed in connection with the feeding-rollers of the upper and lower carbons is so proportioned and arranged that the upper carbons are fed three times as fast as are the lower carbons, whereby all danger of the arc traveling upward beyond the sleeve 36 is avoided, for as soon as the size of the carbon is reduced the levers 58 and 55 will act to throw the clutch 53 into engagement with the pinion 47, so that the upper carbon will be fed downward, the downward motion, however, being checked as soon as the unimpaired peripheral face of the carbon comes in contact with the platinum point 59.

The carbons of the upper-carbon case or magazine may be renewed by removing the cap or cover 150 of the case 10, while the lower carbons are renewed by withdrawing the lower case, 12, from its normal position, after which the plate 87 may be removed from above the carbon-magazine proper, and the carbons may be then introduced to their several receptacles.

Such a lamp as I have described will burn for about one hundred and fifty hours without requiring attention; but it will of course be understood that by increasing the number of carbon-receptacles contained within the magazine the life of the lamp could be materially lengthened, and from the novel construction of the carbons themselves it will be seen that the carbons will be united as they are fed from their magazines, so that they will virtually form one continuous carbon, all parts of the carbons being utilized in the production of the arc.

Having thus fully described my invention, what I claim as new, and desire to secure by Letters Patent, is—

1. The combination, with a spring-actuated revoluble carbon-magazine formed with stops, of a double-armed catch-lever and its connections, substantially as described.

2. The combination, with an upper and a lower carbon magazine, of a mechanism in connection with each magazine for advancing the carbon, a shaft common to both mechanisms, and an electric motor connected with said shaft, substantially as described.

3. The combination, with an upper and lower carbon magazine, of independent feeding mechanism for the two carbons of an electric arc lamp, a shaft common to both mechanisms, and an electric motor connected with said shaft and actuated by the current of the main circuit and by currents derived from said circuit, substantially as described.

4. In an electric-arc lamp, the combination, with a revolving carbon-magazine containing carbon-receptacles arranged about a common central axis, of a plate arranged beneath the magazine and formed with a single aperture, a means, substantially as described, for turning the magazine, and a stop mechanism, substantially as described.

5. In an electric-arc lamp, the combination, with a carbon-magazine provided with carbon-receptacles arranged about a common central axis, of a supporting-plate mounted beneath the magazine and formed with a single aperture, a central supporting-shaft, a spring, 23, arranged in connection with said shaft, stops formed upon the carbon-magazine, a lever arranged to engage with said stops and formed with a hook-point, and a spring arranged in connection with the lever, substantially as described.

6. In an electric-arc lamp, the combination, with a carbon magazine, 16, of carbon-receptacles 17, a central supporting-shaft, 18, a plate, 19, formed with a single aperture, 20, a spring, 23, coiled about the shaft and connected at one end to a plate, 22, a pin, 2, carried by the opposite end of the spring, a hub formed with an apertured arm, through which the pin 2 projects, and with an irregular recess adapted to fit upon a correspondingly-formed portion of the shaft 18, an escapement-lever, 30, formed with a hook-point, 32, a spring, 33, and stops 28 and 29, formed upon the magazine 16, substantially as described.

7. In an electric-arc lamp, the combination, with an upper revolving carbon-magazine constructed and operated substantially as described, of a single-apertured plate arranged beneath said magazine, a carbon feeding and regulating mechanism, substantially as described, and a lower revolving carbon-magazine and its feeding mechanism, a shaft common to both mechanisms, and a motor connected to the shaft, all substantially as described.

8. In an electric-arc lamp, the combination, with an upper-carbon magazine, substantially as described, of a lower-carbon magazine, substantially as described, wherein the carbons are supported by springs 92, carbon-feeding mechanism arranged in connection with the magazines, a shaft common to both feeding mechanisms, and a motor connected to the shaft, substantially as described.

9. In an electric-arc lamp, the combination, with a carbon-magazine, 73, and its inclosing-casing 12, of catches 95, operating-levers 96, and springs 97, substantially as described.

10. In an electric-arc lamp, the combination, with the upper-carbon receptacle and its feeding and actuating mechanisms, substantially as described, of a shaft, 52, a carbon-magazine, 73, provided with carbon-receptacles 74, in which there are arranged springs 92, a central supporting-shaft, 76, a plate, 87, formed with a single aperture, 93, stops or projections upon the magazine 73, a lever, 90, a spring, 85, a collar or hub formed with a feather which rides in a groove formed in the shaft 76, a lug or projection, 82, formed on the hub or collar 81, and an inclined way, 83, fixed to the carbon-receptacles and borne upon by the lug 82, substantially as described.

11. In an electric-arc lamp, the combination, with the lower carbon, of feeding-rollers 70, arranged in opposition to spring-pressed rollers 71, gears 69, carried by the shafts of the rollers 70, a gear, 68, a pinion, 66, a worm, 65, formed on a shaft, 52, and engaging with the pinion 66, and an electric motor, 60, substantially in the manner herein described.

12. In an electric-arc lamp, the combination, with an upper-carbon magazine and its actuating mechanism, substantially as described, of a carbon-feeding mechanism consisting, essentially, of the feeding-rollers 44 44, rollers 37 and 38, arranged in opposition to the rollers 44 and carried by a frame, 40, a spring, 42, borne upon by an adjusting-screw, 43, gears 48, carried by the shafts of the feeding-rollers 44, a gear, 45, engaging with the gears 48 and fixed to a shaft, 46, a pinion loosely mounted on the shaft 46, a worm formed upon a shaft, 52, that is actuated by an electric motor, a clutch, 53, that is engaged by a lever, 55, and a second lever, 58, engaging with the lever 55 and bearing against the peripheral face of the carbon, substantially as described.

13. A focusing attachment for electric-arc lamps, consisting, essentially, of the following elements: a lever formed with a point which bears upon the peripheral face of the carbon, a second lever engaged by the first, and a clutch operated by the second lever and arranged in connection with the feeding mechanism of the upper carbons, substantially as described.

14. In an electric-arc lamp, the combination, with an electric motor of which the field-magnets are in the main circuit, of a slight resistance, a circuit operating by a derived current, said circuit including a pole-changer and the armature of the motor, a cut-out, and a second resistance interposed between the cut-out and the negative post of the lamp, and a cut-out magnet of which the armature is carried by a lever, and a link connected to the said lever and extending to the pole changer, substantially as described.

15. In an electric-arc lamp, the combination, with an electric motor of which the field-magnets are in the main circuit, of a slight resistance, a circuit operating by a derived current from said resistance, said circuit including a pole-changer and the armature of the motor, a cut-out, and a second resistance interposed between the cut-out and the negative post of the lamp, and a cut-out magnet of which the armature is carried by a lever, a link connected to said lever and extending to the pole-changer, and a shunt-circuit, including a magnet, arranged in opposition to the cut-out magnet and passing thence around the armature of the motor and to the negative post of the lamp, substantially as described.

16. In an electric-arc lamp, the combination, with the carbon-feeding magazine, of an electric motor the field-magnets of which are in the main circuit, said motor being provided with two commutators, one of which operates in connection with the shunt, while the other operates in connection with a circuit, the current of which is derived from a resistance arranged in the main circuit, a pole-changer being arranged in said circuit, a resistance arranged between the cut-out and the negative post of the lamp, a cut-out magnet, and a link connecting the cut-out lever and the pole-changer, substantially as described.

17. In an electric-arc lamp, the combination, with an electric motor of which the field-magnets are in the main circuit, of a slight resistance, a circuit including the armature of the motor and operating by a current derived from the resistance, a cut-out, and a heavy resistance interposed between the cut-out and the negative part of the lamp.

JULIAN F. DENISON.

Witnesses:
E. THEO. LIEFELD,
C. H. FOWLER.